United States Patent
Sengodan et al.

(10) Patent No.: US 12,362,667 B2
(45) Date of Patent: Jul. 15, 2025

(54) SYSTEM AND METHOD HAVING A SWITCHING CONVERTER AND SELF-SWITCHED CHARGE PUMP CONFIGURATION

(71) Applicant: Goodrich Corporation, Charlotte, NC (US)

(72) Inventors: Rajkumar Sengodan, Namakkal (IN); Saravanan Munusamy, Chengalpattu (IN)

(73) Assignee: Goodrich Lighting Systems, Inc., Phoenix, AZ (US)

( * ) Notice: Subject to any disclaimer, the term of this patent is extended or adjusted under 35 U.S.C. 154(b) by 201 days.

(21) Appl. No.: 18/350,346

(22) Filed: Jul. 11, 2023

(65) Prior Publication Data

US 2024/0413747 A1    Dec. 12, 2024

(30) Foreign Application Priority Data

Jun. 9, 2023    (IN) .............. 202341039541

(51) Int. Cl.
*H02M 3/07* (2006.01)
*H02M 1/00* (2006.01)
*H02M 3/158* (2006.01)

(52) U.S. Cl.
CPC ............ *H02M 3/07* (2013.01); *H02M 1/009* (2021.05); *H02M 3/158* (2013.01)

(58) Field of Classification Search
None
See application file for complete search history.

(56) References Cited

U.S. PATENT DOCUMENTS

| | | | |
|---|---|---|---|
| 6,548,966 B2 * | 4/2003 | Kawasaka | H05B 41/386 315/291 |
| 7,382,634 B2 | 6/2008 | Buchmann | |
| 10,999,910 B2 | 5/2021 | Sengodan | |
| 11,496,047 B2 | 11/2022 | Giuliano | |
| 2021/0083571 A1 | 3/2021 | Giuliano et al. | |

OTHER PUBLICATIONS

European Patent Office, European Search Report dated Oct. 31, 2024 in Application No. 24180439.2.

(Continued)

*Primary Examiner* — Cassandra F Cox
(74) *Attorney, Agent, or Firm* — SNELL & WILMER L.L.P.

(57) ABSTRACT

A system for controlling power provided to an electronic device is disclosed herein. The system includes a switching direct current (DC) power source configured to provide an input voltage at a first frequency, a forward converter coupled to the switching DC power source, wherein the forward converter outputs a first voltage and a second voltage, a frequency multiplier coupled to the forward converter and configured to receive the first voltage as an input, a switch coupled to the frequency multiplier and configured to be driven by the frequency multiplier, wherein the switch outputs a fourth voltage, and a voltage multiplier coupled to the switch and configured to be driven by the switch, wherein the voltage multiplier receives the second voltage and outputs a fifth voltage that is greater than the second voltage.

20 Claims, 9 Drawing Sheets

(56) References Cited

OTHER PUBLICATIONS

Ulusan Hasan et al, "Stage optimization in regulated step-up low voltage electromagnetic energy harvesters", 5th International Conference on Energy Aware Computing Systems & Applications, IEEE, dated Mar. 24, 2015 (Mar. 24, 2015), pp. 1-4, DOI: 10.1109/ICEAC.2015.7352198 [retrieved on Dec. 9, 2015].

Kawauchi Hayato et al, "A 2v 3.8 W Fully-Integrated Clocked AC-DC Charge Pump with 0.5V 500 [Omega] Vibration Energy Harvester", 2019 IEEE Asia Pacific Conference on Circuits and Systems (APCCAS), IEEE, dated Nov. 11, 2019 (Nov. 11, 2019), pp. 329-332, DOI: 10.1109/APCCAS47518.2019.8953130, [retrieved on Jan. 8, 2020].

Kawauchi Hayato et al, "A clocked AC-DC voltage multiplier for increasing the power conversion efficiency in vibration energy harvesting", dated Mar. 20, 2018 (Mar. 20, 2018), pp. 51-51, Retrieved from the Internet: URL: https://shizuoka.repo.nii.ac.jp/record/10838/files/181010003.pdf [retrieved on Oct. 22, 2024].

* cited by examiner

Continued from FIG. 2A

SYSTEM AND METHOD HAVING A SWITCHING CONVERTER AND SELF-SWITCHED CHARGE PUMP CONFIGURATION

CROSS-REFERENCE TO RELATED APPLICATIONS

This application claims priority to, and the benefit of, India Provisional Patent Application No. 202341039541, filed Jun. 9, 2023 (DAS Code E9D3) titled "SYSTEM AND METHOD HAVING A SWITCHING CONVERTER AND SELF-SWITCHED CHARGE PUMP CONFIGURATION," which is incorporated by reference herein in its entirety for all purposes.

FIELD

The present disclosure generally relates to a power supply to overcome electromagnetic interference (EMI) in power sensitive circuits.

BACKGROUND

Small electronics including light emitting diodes (LEDs), displays, non-volatile memories, and small electronics may be sensitive to electromagnetic interference (EMI). The EMI may be introduced by the power supply to the small electronics resulting in shorter life span and/or damage to the small electronics.

SUMMARY

A system is disclosed herein. The system includes a switching direct current (DC) power source configured to provide an input voltage at a first frequency, a forward converter coupled to the switching DC power source, wherein the forward converter outputs a first voltage and a second voltage, a frequency multiplier coupled to the forward converter and configured to receive the first voltage as an input, a switch coupled to the frequency multiplier and configured to be driven by the frequency multiplier, wherein the switch outputs a fourth voltage, and a voltage multiplier coupled to the switch and configured to be driven by the switch, wherein the voltage multiplier receives the second voltage and outputs a fifth voltage that is greater than the second voltage.

In various embodiments, the forward converter configured to isolate the system from the switching DC power source. In various embodiments, the second voltage is rectified. In various embodiments, the system further includes a filter coupled to the forward converter and configured to receive the second voltage and output a third voltage, wherein the third voltage is filtered or smoothed to remove pulses introduced by the switching DC power source.

In various embodiments, the switch further coupled to the filter. In various embodiments, the frequency multiplier increases the first frequency to a second frequency. In various embodiments, the second frequency is twice the first frequency. In various embodiments, the system further includes a load coupled to the voltage multiplier and configured to be driven by the fifth voltage, wherein the load includes a plurality of light emitting diodes (LEDs) and a current controller coupled to the load and configured to control a current flow through the load.

In various embodiments, the frequency multiplier includes a delay circuit coupled to the forward converter, a comparator coupled to the delay circuit, a first XOR gate configured to receive an output from the first voltage and an output from the comparator as inputs, and a second XOR gate configured to receive an output from the delay circuit and the output from the comparator as inputs. In various embodiments, the switch is a half-bridge switch.

Also disclosed herein is a system including a switching direct current (DC) power source configured to provide an input voltage at a first frequency, a forward converter coupled to the switching DC power source, wherein the forward converter outputs a first voltage and a second voltage, a frequency divider coupled to the forward converter and configured to receive the first voltage as an input, a switch coupled to the frequency divider and configured to be driven by the frequency divider, wherein the switch outputs a fourth voltage, and a voltage multiplier coupled to the switch and configured to be driven by the switch, wherein the voltage multiplier receives the second voltage and outputs a fifth voltage that is greater than the second voltage.

In various embodiments, the system further includes a filter coupled to the forward converter and configured to receive the second voltage and output a third voltage, wherein the third voltage is filtered or smoothed to remove pulses introduced by the switching DC power source. In various embodiments, the frequency divider decreases the first frequency to a second frequency. In various embodiments, the voltage multiplier includes a plurality of diodes and a plurality of capacitors configured to charged sequentially through a diode of the plurality of diodes in response to an output from the switch.

In various embodiments, the system further includes a filter coupled to the forward converter and configured to receive the second voltage and output a third voltage, wherein the third voltage is filtered or smoothed to remove pulses introduced by the switching DC power source. In various embodiments, the system further includes a load coupled to the voltage multiplier and configured to be driven by the fifth voltage and a current controller coupled to the load and configured to control a current flow through the load. In various embodiments, the load includes a plurality of light emitting diodes connected in series.

In various embodiments, the frequency divider includes a delay circuit, a divider configured to receive an output from the delay circuit as an input and to output a second frequency, and an inverter configured to invert the output of the divider. In various embodiments, the switch is a half-bridge switch. In various embodiments, the system further includes a first metal-oxide-semiconductor field effect transistor (MOSFET), a second MOSFET coupled in series to the first MOSFET, a first driver configured to control the first MOSFET and the second MOSFET, wherein the first MOSFET and the second MOSFET output the fourth voltage at a second frequency, a third MOSFET, a fourth MOSFET coupled in series to the third MOSFET, and a second driver configured to control the third MOSFET and the fourth MOSFET, wherein the third MOSFET and the fourth MOSFET output the fourth voltage at a third frequency opposite the second frequency.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein is a power supply configuration for a light emitting diode (LED) drive with frequency multiplier or divider and a charge pump drive configuration to overcome electromagnetic interference (EMI) in power sensitive applications. In various embodiments, the power sensitive applications may include displays, non-volatile memories, and small electronic devices in aircraft, automobiles, and consumer electronics. In various embodiments, the power supply configuration includes a diode chain capacitive voltage multiplier that provides a voltage output with improved efficiency.

Figure 1:
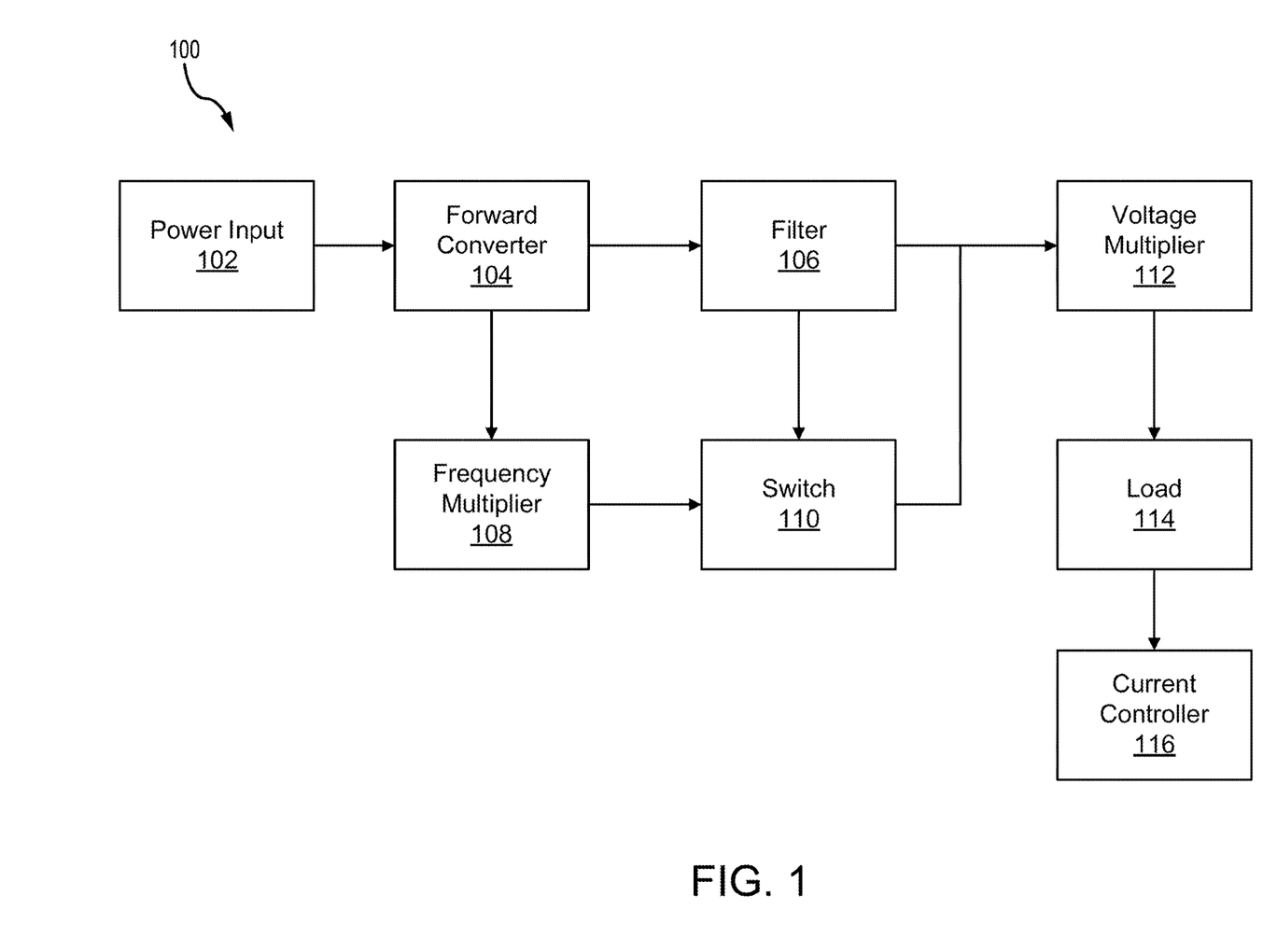
FIG. 1 illustrates a forward converter output system for driving electromagnetic interference sensitive electronics, in accordance with various embodiments.

Referring now to FIG. 1, a forward converter output system, system 100, for converting switched DC power to provide regulated high voltage is illustrated, in accordance with various embodiments. System 100 is a self-switched capacitive multiplier topology for high voltage and low ripple applications with a reduced electromagnetic interference (EMI) drive due to its simple structure having fewer components. As described herein, and in various embodiments, system 100 may supply a load current with little to no power ripple, little to no power loss, and/or little to no efficiency loss. System 100 includes a power input 102, a forward converter 104, a filter 106, a frequency multiplier 108, a switch 110, a voltage multiplier 112, a load 114, and a current controller 116.

Power input 102 is a direct current (DC) power input to system 100. Power input 102 may provide a voltage input to system 100. In various embodiments, power input 102 may be a switching DC power supply. In various embodiments, power input 102 provides a pulse width modulated (PWM) DC signal that operates at an input frequency. The input frequency may be any frequency depending on the application of system 100, and in various embodiments, the input frequency may be about 10 kHz. The voltage input may be any voltage based on the purpose of the application of system 100, and in various embodiments, may be about 20 V. Forward converter 104 is a DC-DC power converter to power system 100. Forward converter 104 receives the DC voltage (e.g., 20 V) from power input 102 and outputs an equivalent DC voltage (e.g., 20 V). Forward converter 104 further rectifies the DC pulse received from power input 102 so that the DC voltage output is constant. Forward converter 104 provides DC power to filter 106 and frequency multiplier 108. Filter 106 regulates the DC power received from forward converter 104 by filtering, or smoothing, any pulse in the rectified DC power input from forward converter 104.

Frequency multiplier 108 multiplies the input frequency to a designed output frequency. In various embodiments, frequency multiplier 108 may divide the input frequency to the designed output frequency. In various embodiments, the multiplier, or divisor, may be any value to increase or decrease the input frequency to the desired output frequency. Voltage multiplier 112, also referred to as a charge pump, multiplies the DC power received from filter 106 and switching DC power from switch 110 to generate an output voltage that is larger than the input voltage.

Load 114 is powered by voltage multiplier 112. In various embodiments, load 114 may be a plurality of light emitting diodes (LEDs). Current controller 116 controls the current flow of system 100. In various embodiments, current controller 116 may further control a brightness of the plurality of LEDs.

Figure 2A:
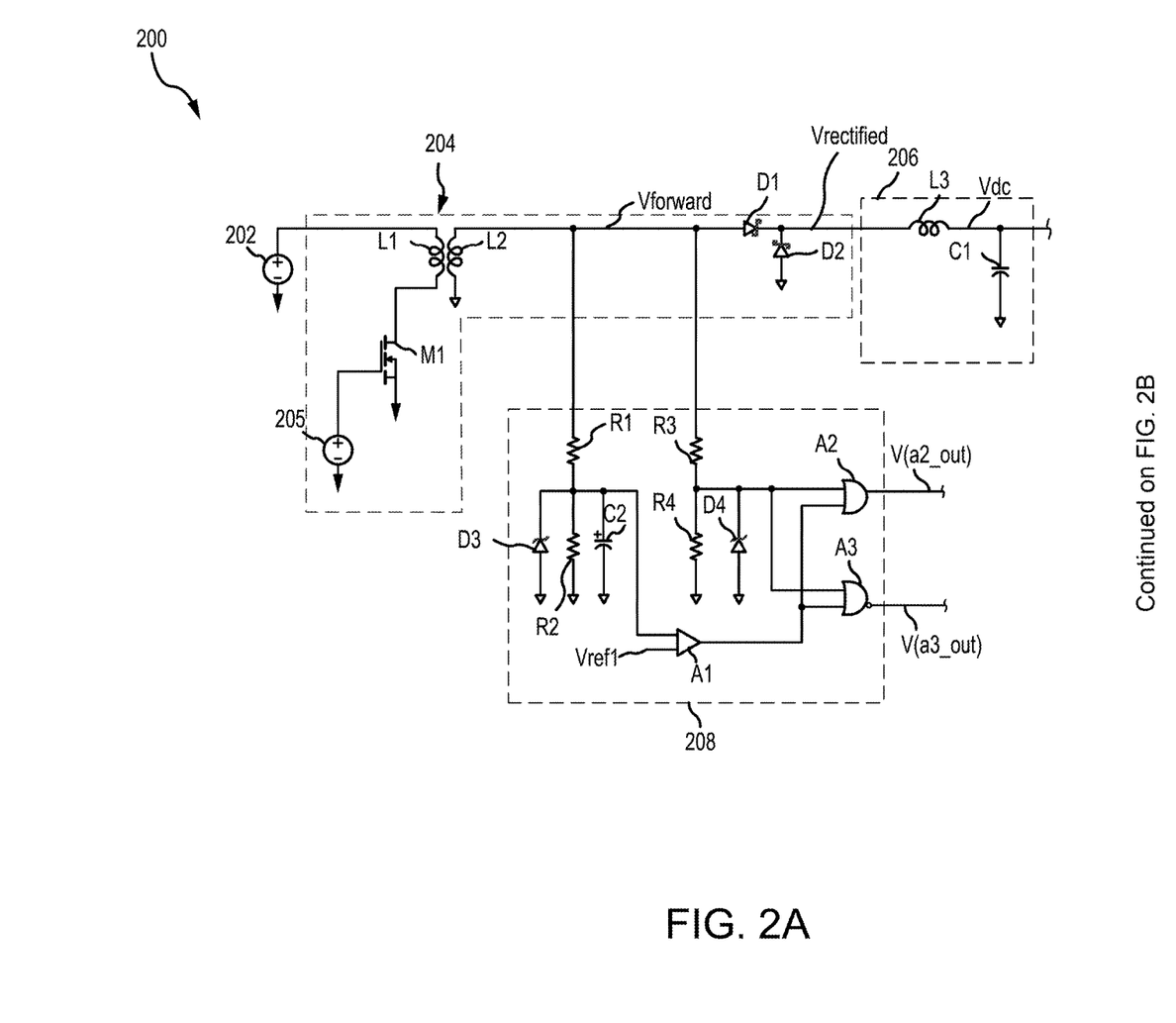
FIGS. 2A and 2B illustrate a schematic for a forward converter output system with a capacitive stage and frequency multiplier configuration, in accordance with various embodiments.
Figure 2B:
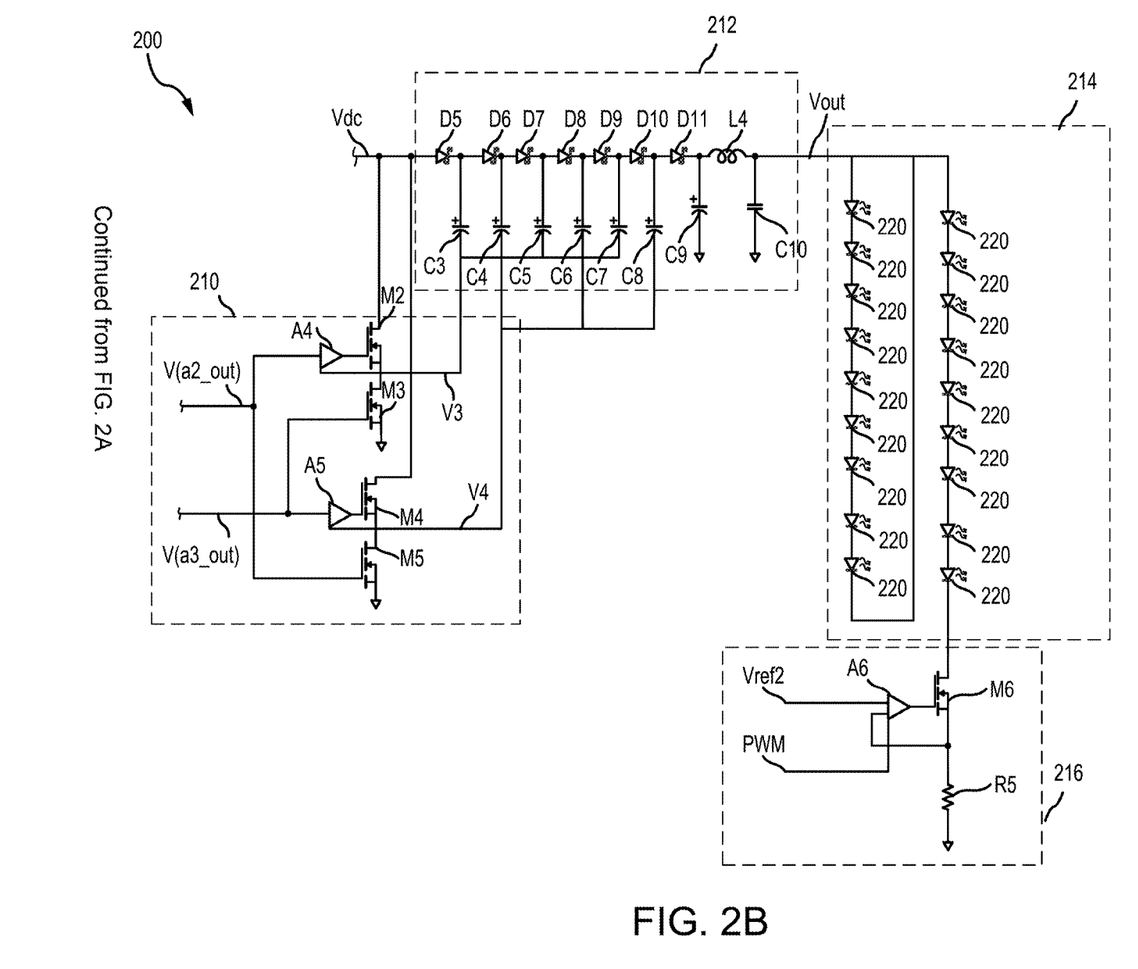

Referring now to FIGS. 2A and 2B, a schematic 200 for a forward converter output system with a capacitive stage and frequency multiplier configuration is illustrated, in accordance with various embodiments. In various embodiments, schematic 200 may be an implementation of system 100 described above in FIG. 1. Schematic 200 includes circuit diagram symbols representing components in a circuit that perform the tasks described above with respect to system 100 in FIG. 1. Schematic 200 includes similar components to system 100 described above in FIG. 1 including a power source 202, a forward converter 204, a filter 206, a frequency multiplier 208, a switch 210, a voltage multiplier 212, a light emitting diode (LED) load 214, and a current controller 216.

Referring first to FIG. 2A, power source 202 provides power to load 214 through the various components in schematic 200. In various embodiments, power source 202 may be a switching power source that switches at a first frequency of about 10 kHz to about 100 kHz. In various embodiments, the first frequency may be any frequency based on the application in which schematic 200 is used. In various embodiments power source 202 may output a first voltage that is about 5 V to about 72 V, and more specifically, about 20 V to about 28 V. In various embodiments, the first voltage may be higher or lower depending on the design of load 214.

Forward converter 204 includes a first inductor L1, a second inductor L2, a first metal-oxide-semiconductor field-effect-transistor (MOSFET) M8, a power source 205, a first diode D1, and a second diode D2. forward converter 204 is a DC-DC converter that isolates the components of schematic 200 from power source 202. Forward converter 204 includes two outputs, a first output Vforward to frequency multiplier 208 and a second output $V_{rectified}$ to filter 206. First output Vforward is the output of second inductor L2 and is about equal to the output of power source 202 (e.g., about 5 V) and switches from first output $V_{forward}$ to 0 V at the same frequency (e.g., 10 kHz) as power source 202. Second output $V_{rectified}$ is a rectified voltage that is about the same voltage as first output $V_{forward}$ is steady at first output $V_{forward}$ without switching.

Filter 206 includes a third inductor L3 and a first capacitor C1. Filter 206 regulates second output $V_{rectified}$ from forward converter 204 by filtering, or smoothing, second output $V_{rectified}$ to output a first voltage Vdc that is about equal to second output $V_{rectified}$ (e.g., 5 V). That is, first voltage Vdc may be steady while second output $V_{rectified}$ include some variation based on the first frequency of power source 202.

Frequency multiplier 208 is connected to, and receives, first output $V_{forward}$ from forward converter 204. Frequency multiplier 208 includes a first resister R1, a second resister R2, a third resister R3, a third diode D3, a fourth diode D4, a second capacitor C2, a comparator A1, a first XOR gate A2 that outputs a voltage V(a2_out), and a second XOR gate A3 that outputs a voltage V(a3_out). Frequency multiplier 208 multiplies the first frequency to a second frequency that is higher than the first frequency (e.g., two times higher). This creates a secondary switching pulse at the second frequency that drives first XOR gate A2 and second XOR gate A3.

First resistor R1, second resistor R2, and second capacitor C2 form a delay circuit with first resistor coupled to first output $V_{forward}$ at a first side and to second resistor R2, second capacitor C2, third diode D3, and comparator A1 at a second side. In various embodiments, the delay induced by the delay circuit may be about 5 ns to about 25 ns, and more specifically, about 10 ns. Third diode D3, second resistor R2, and second capacitor C2 are coupled to ground. Comparator A1 has a first input coupled to the delay circuit and a second input coupled to a reference voltage Vref1. In various embodiments, the output of comparator A1 is logic high (e.g., 20 V) in response to first output $V_{forward}$ being logic low (e.g., 0 V) and the output of comparator A1 is logic low (e.g., 0 V) in response to first output $V_{forward}$ being logic high (e.g., 20 V). In various embodiments, the second frequency may be changed, either higher or lower, by changing reference voltage Vref1 either higher or lower, respectively. Additionally, reference voltage Vref1 establishes a 50% threshold for the delay circuit (i.e., first resistor R1, second resistor R2, and second capacitor C2). The output of comparator A1 is coupled to a first input of first XOR gate A2 and a first input of second XOR gate A3.

Third resistor R3 is coupled to first output $V_{forward}$ at a first end and to fourth resistor R4, fourth diode D4, first XOR gate A2, and second XOR gate A3 at a second end. Fourth resistor R4 and fourth diode are coupled to ground. The second end of third resistor R3 is coupled to a second input to first XOR gate A2 and a second input to second XOR gate A3.

The operation of frequency multiplier 208 may be illustrated by its response to first output $V_{forward}$ from forward converter 204 switching between logic low (e.g., 0 V) and logic high (e.g., 28 V) at the first frequency (e.g., 20 kHz). When first output $V_{forward}$ is logic low (e.g., 0 V) and reference voltage Vref1 is about half of logic high (e.g., 14 V), the output of comparator A1 is logic high (e.g., 28 V). When first output $V_{forward}$ is logic high (e.g., 28 V) and reference voltage Vref1 is about half of logic high (e.g., 14 V), the output of comparator A1 is logic low (e.g., 0 V). That is, the output comparator A1 inverts the signal from second output $V_{forward}$. The output of comparator A1 and first output $V_{forward}$ are provided as inputs to both first XOR gate A2 and second XOR gate A3. Voltage V(a2_out) is output from the non-inverting output terminal of first XOR gate A2 so that voltage V(a2_out) is logic high (e.g., 28 V) in response to one input being logic high and the other input being logic low. Similarly, voltage V(a2_out) is logic low (e.g., 0 V) in response to both inputs being logic high or both inputs being logic low. Voltage V(a3_out) is output from the inverting output terminal of second XOR gate A3 so that output V(a3_out) is logic low (e.g., 0 V) in response to one input being logic high and the other input being logic low. Similarly, voltage V(a3_out) is logic high (e.g., 28 V) in response to both inputs being logic high or both inputs being logic low. But after the delay circuit responds (i.e., first resistor R1, second resister R2, and second capacitor C2), voltages V(a2_out) and V(a3_out) invert. Thus, a single rising edge from power source 202 causes a single negative pulse at voltage V(a2_out) of first XOR gate A2. In a similar manner, frequency multiplier 208 produces a single pulse in response to a falling edge from power source 202. The resulting output doubles the first frequency 20 kHz to 40 KHz.

Referring now to FIG. 2B, voltages V(a2_out) and V(a3_out) drive switch 210. In various embodiments, switch 210 may be a half-bridge switch. Switch 210 includes a first MOSFET gate driver, a first driver A4, a second driver A5, a second MOSFET M2, a third MOSFET M3, a fourth MOSFET M4, and a fifth MOSFET M5. In various embodiments, MOSFETS M1-M5 may be configured as n-channel MOSFETS and p-channel MOSFETS or all of n-channel MOSFETS. Voltage V(a2_out) of first XOR gate A2 and voltage V(a3_out) of second XOR gate A3 operate switch 210 with voltage V(a2_out) controlling first driver A4 and fifth MOSFET M5 and voltage V(a3_out) controls second driver A5 and third MOSFET M3. The output of first driver A4 controls second MOSFET M2 and the output of second driver A5 controls fourth MOSFET M4. Second MOSFET M2 is coupled to first voltage Vdc at one end and to third MOSFET M3 at the other end and third MOSFET M3 is coupled to ground. A third voltage V3 is the output of second MOSFET M2 and third MOSFET M3 and third voltage V3 is an input to first driver A4. Fourth MOSFET M4 is coupled to first voltage Vdc at one end and to fifth MOSFET M5 at the other end and fifth MOSFET M5 is coupled to ground. A fourth voltage V4 is the output of fourth MOSFET M4 and fifth MOSFET M5 and fourth voltage V4 is an input to second driver A5. Switch 210 operates with voltage multiplier 212 to increase the voltage of power source 202 to an output voltage that is higher than the input voltage.

Voltage multiplier 212 steps up first voltage Vdc to an output voltage Vout. Voltage multiplier 212 includes a fifth diode D5, a sixth diode D6, a seventh diode D7, an eight diode D8, a ninth diode D9, a tenth diode D10, a fourth inductor L4, a third capacitor C3, a fourth capacitor C5, a sixth capacitor C6, a seventh capacitor C7, and eighth capacitor C8, a ninth capacitor C9, and a tenth capacitor C10. Diodes D5-D11 and capacitors C3-C8 operate as a diode clamped capacitor array that operates sequentially to step-up first voltage Vdc to output voltage Vout. In the illustrated embodiment, a six capacitor stage circuit is illustrated and described. In various embodiments, voltage multiplier 212 may include more than six capacitors or fewer than six capacitors depending on the system design. First output $V_{forward}$ and first voltage Vdc operate the diode clamped capacitor array. Capacitors C3, C5, and C7 are connected to diodes D5-D11 at one end and to third voltage V3 at the other end. Capacitors C4, C6, and C8 are connected to diodes D5-D11 at one end and to fourth voltage V4 at the other end.

In operation, first voltage Vdc charges third capacitor C3 at each switching cycle. Each switching cycle is generated by switch 210 as driven by frequency multiplier 208. That is, switch 210 (i.e., the half bridge switch including MOSFETS M2-M5) acts in a push-pull configuration, a charge pump, to charge capacitors C3-C8 individually with each input switch. At an initial state, third capacitor C3 is charged a voltage Vc3b (e.g., 5 V) through fifth diode D5 where voltage Vc3 is about equal to first voltage Vdc minus minimal losses from switch 210 and fifth diode D5. In response to switch 210 switching, fourth capacitor C4 is charged to a voltage Vc4 (e.g., 10 V) through sixth diode D6 where voltage Vc4 is about equal to first voltage Vdc plus voltage Vc3 minus minimal losses from switch 210 and sixth diode D6. In response to switch 210 switching, fifth capacitor C5 is charged to a voltage Vc5 (e.g., 15 V) through seventh diode D7 where voltage Vc5 is about equal to first voltage Vdc plus voltage Vc3 plus voltage Vc4 minus minimal losses from switch 210 and seventh diode D7. In response to switch 210 switching, sixth capacitor C6 is charged to a voltage Vc6 (e.g., 20 V) through eighth diode D8 where voltage Vc6 is about equal to first voltage Vdc plus voltage Vc3 plus voltage Vc4 plus voltage Vc5 minus minimal losses from switch 210 and eighth diode D8. In response to switch 210 switching, seventh capacitor C7 is charged to a voltage Vc7 (e.g., 25 V) through ninth diode D9 where voltage Vc8 is about equal to first voltage Vdc plus voltage Vc3 plus voltage Vc4 plus voltage Vc5 plus voltage Vc6 minus minimal losses from switch 210 and ninth diode D9. In response to switch 210 switching, eighth capacitor C8 is charged to a voltage Vc8 (e.g., 30 V) through tenth diode D10 where voltage Vc8 is about equal to first voltage Vdc plus voltage Vc3 plus voltage Vc4 plus voltage Vc5 plus voltage Vc6 plus voltage Vc7 minus minimal losses from switch 210 and seventh diode D7. In subsequent cycles (i.e., in response to switch 210 switching), ninth capacitor C9 outputs a load voltage (i.e., output voltage Vout) to load 214.

Load 214 includes an electric load that is driven by output voltage Vout. Load 214 includes a plurality of light emitting diodes (LEDs) 220 that are connected in series with current controller 216. In various embodiments, load 214 may include more or fewer LEDs 220. In various embodiments, load 214 may be other electronic devices that are sensitive to electromagnetic interference (EMI).

Current controller 216 includes a sixth MOSFET M6, a fifth resistor R5, and an amplifier A6. Fifth resistor R5 is a current limiting resister that is configured to drop excess voltage across MOSFET M6. MOSFET M6 may be an NMOS transistor. Amplifier A6 has a first input a controlled by a second reference voltage Vref2 and a second input controlled by a pulse width modulation (PWM) signal that engages and disengages amplifier A6 to modify a brightness of LEDs 220.

As described herein, voltage multiplier 212, or charge pump stage, increases output voltage Vout until LEDs 220 get into forward bias and the output current is minimum due to single converter. Additionally, output voltage Vout is high enough to deliver the voltage for LED conduction so that the current will be at a minimum across LEDs 220. During operation, voltage multiplier 212 operates the forward bias voltage, output voltage Vout, into the operating region of LEDs 220 so that the forward current increases linearly as output voltage Vout increases and thereby increases the luminance of LEDs 220. The current is controlled by MOSFET M6 and the color temperature of LEDs 220 is maintained. The duty cycle of the switching of LEDs 220 can be configured to obtain min and max luminance. In various embodiments, the first frequency of power source 202, a pulse input frequency, may be configured to obtain optimal switching loss depending on the number of LEDs and their current consumption.

Figure 3A:
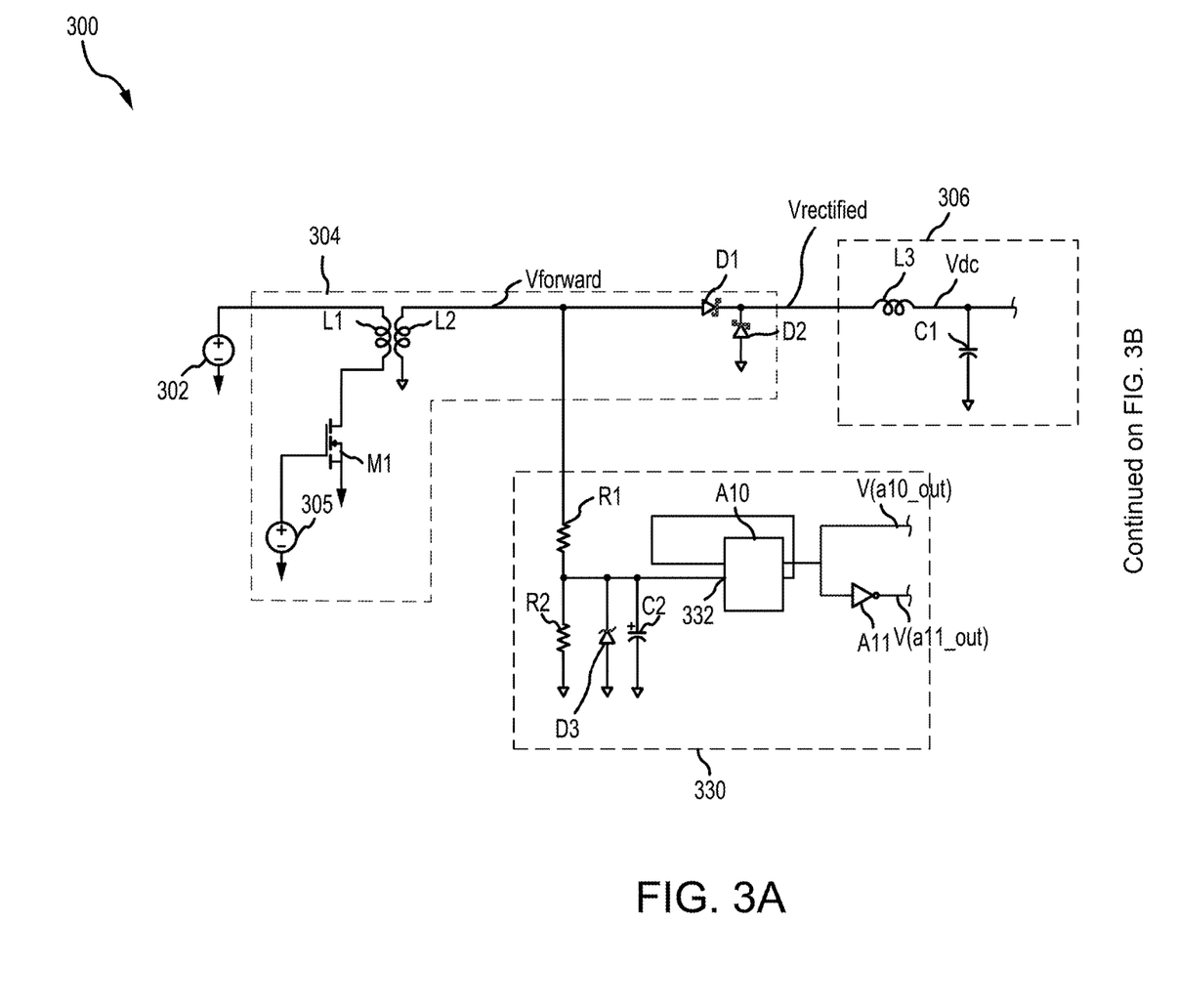
FIGS. 3A and 3B illustrate a schematic for a forward converter output system with a capacitive stage and frequency divider configuration, in accordance with various embodiments.
Figure 3B:
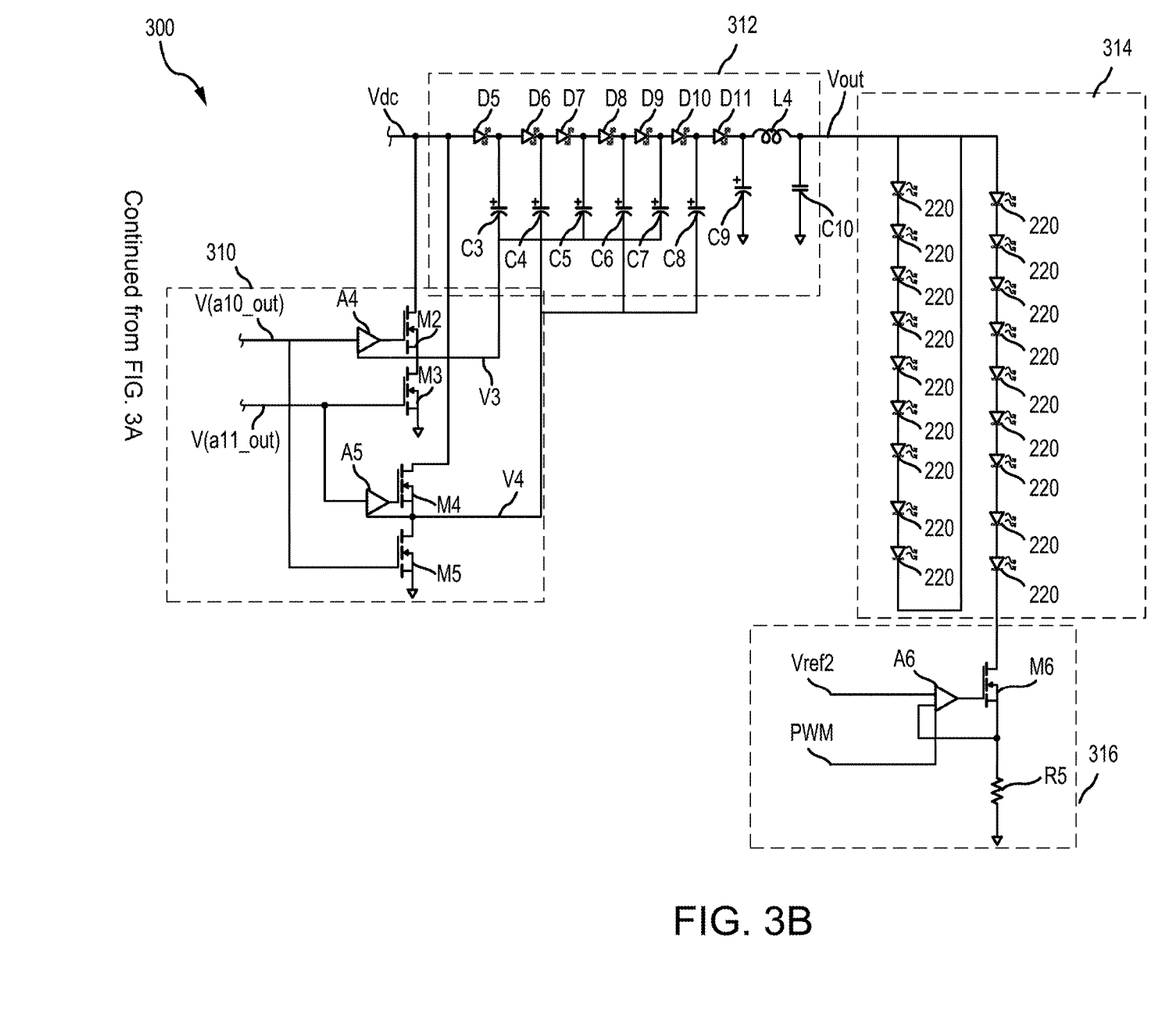

Referring now to FIGS. 3A and 3B, a schematic 300 for a forward converter output system with a capacitive stage and frequency divider configuration is illustrated, in accordance with various embodiments. In various embodiments, schematic 300 may be an implementation of system 100 described above in FIG. 1. Schematic 300 includes circuit diagram symbols representing components in a circuit that perform the tasks described above with respect to system 100 in FIG. 1. Schematic 300 includes similar components to those described above with respect to schematic 200 in FIGS. 2A and 2B including a power source 302, a forward converter 304, a filter 306, a switch 310, a voltage multiplier 312, a light emitting diode (LED) load 314, and a current controller 316. Each of these components in schematic 300 includes similar sub-components to those described above in schematic 200 in FIGS. 2A and 2B, the individual descriptions of which will not be repeated below.

Schematic 300 further includes a frequency divider 330. Frequency divider 330 downscales the first frequency of power source 302. In various embodiments, frequency divider 330 downscales first frequency by half (e.g., 20 kHz to 10 kHz). Frequency divider 330 includes a first resister R1, a second resister R2, a third diode D3, a second capacitor C2, a divider A10, and an inverter A11. First resister R1, second resister R2, and second capacitor C2 function as a delay circuit. Divider A10 includes a clock input 332 that is coupled to the delay circuit and provides an output that pulses at a third frequency that is less than the first frequency of power source 302. Inverter A11 is coupled to the output of divider A10 so that frequency divider 330 provides a first output V(a10_out) and a second output (Va11_out), similar to frequency multiplier 208. Similar to frequency multiplier 208, first output V(a10_out) and second output (Va11_out) control switch 310, as described above in FIGS. 2A and 2B.

Figure 4:
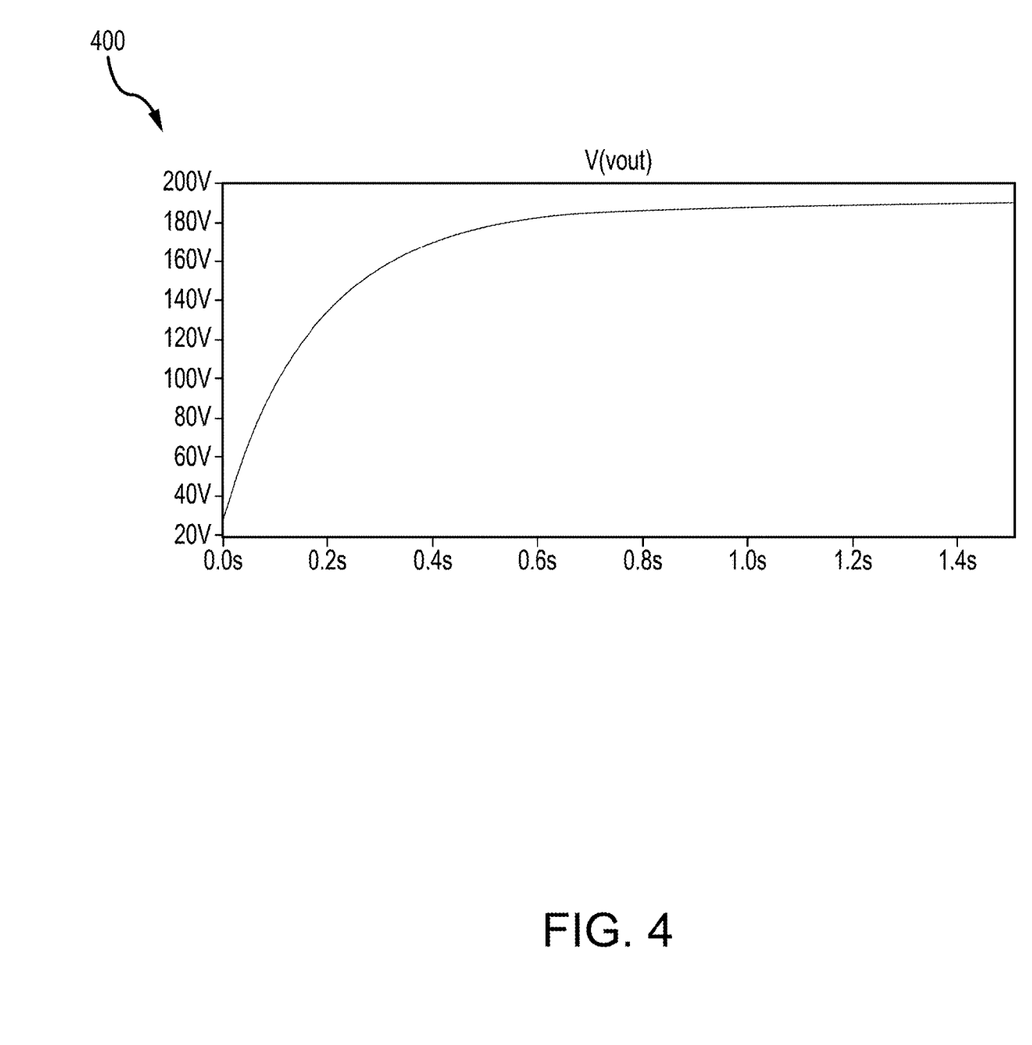
FIG. 4 illustrates a plot of the output voltage of a system with no load applied, in accordance with various embodiments.

Referring now to FIG. 4, a plot 400 showing output voltage Vout over time with no electrical load (i.e., no LEDs 220) is illustrated, in accordance with various embodiments. Plot 400 illustrates output voltage Vout when power source 202 provides an input voltage of 28 V and the first frequency is 20 kHz, with Vref1 and Vref2 at about 2.5 V. As illustrated, using schematic 200, the input voltage of 28 V is increased to about 189 V at output voltage Vout, without a load. The expected output voltage is about 196 V with some voltage loss, as explained above.

Figure 5A:
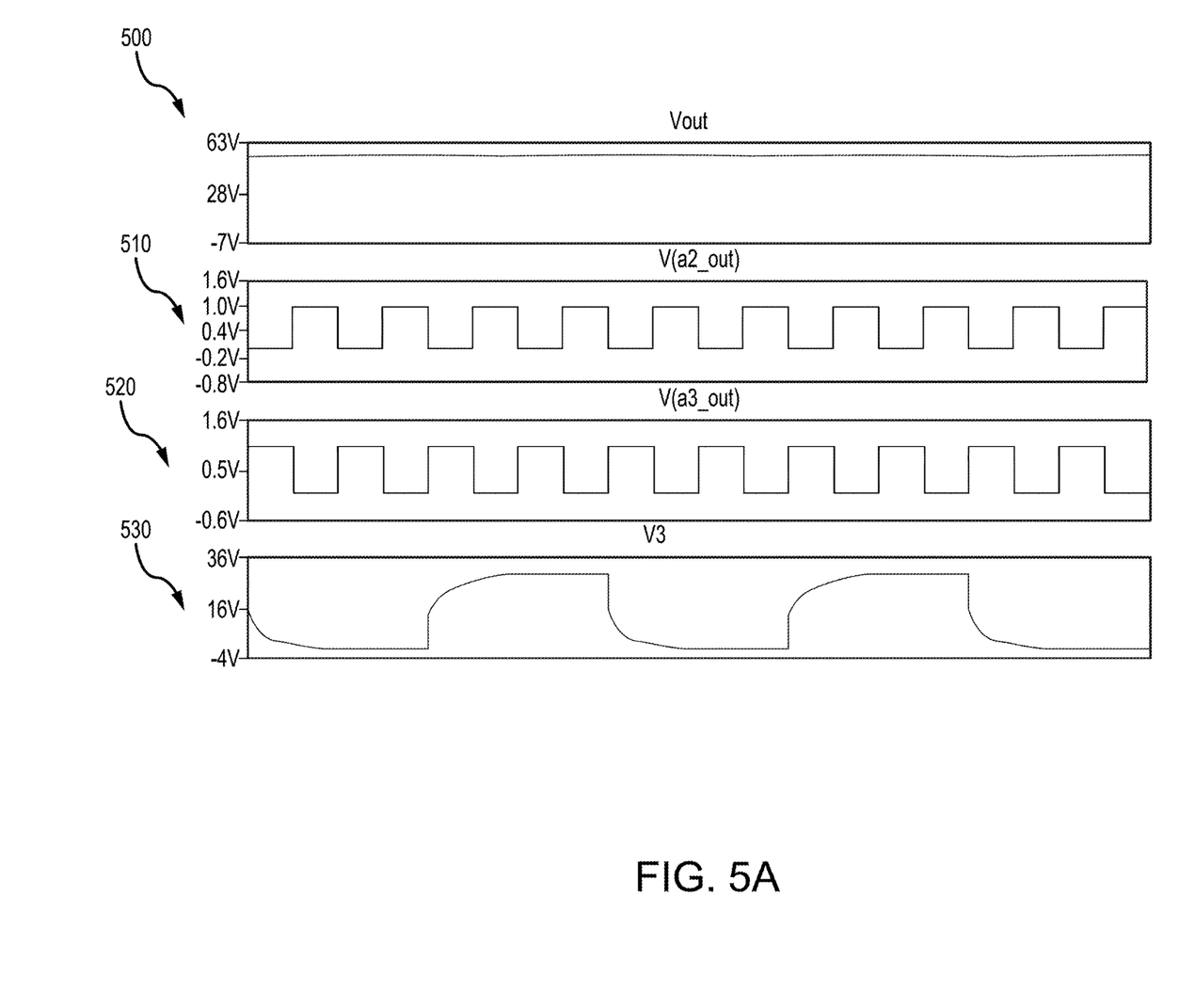
FIGS. 5A, 5B, and 5C illustrate plots of voltages and currents at various points in a system with a load applied, in accordance with various embodiments.
Figure 5B:
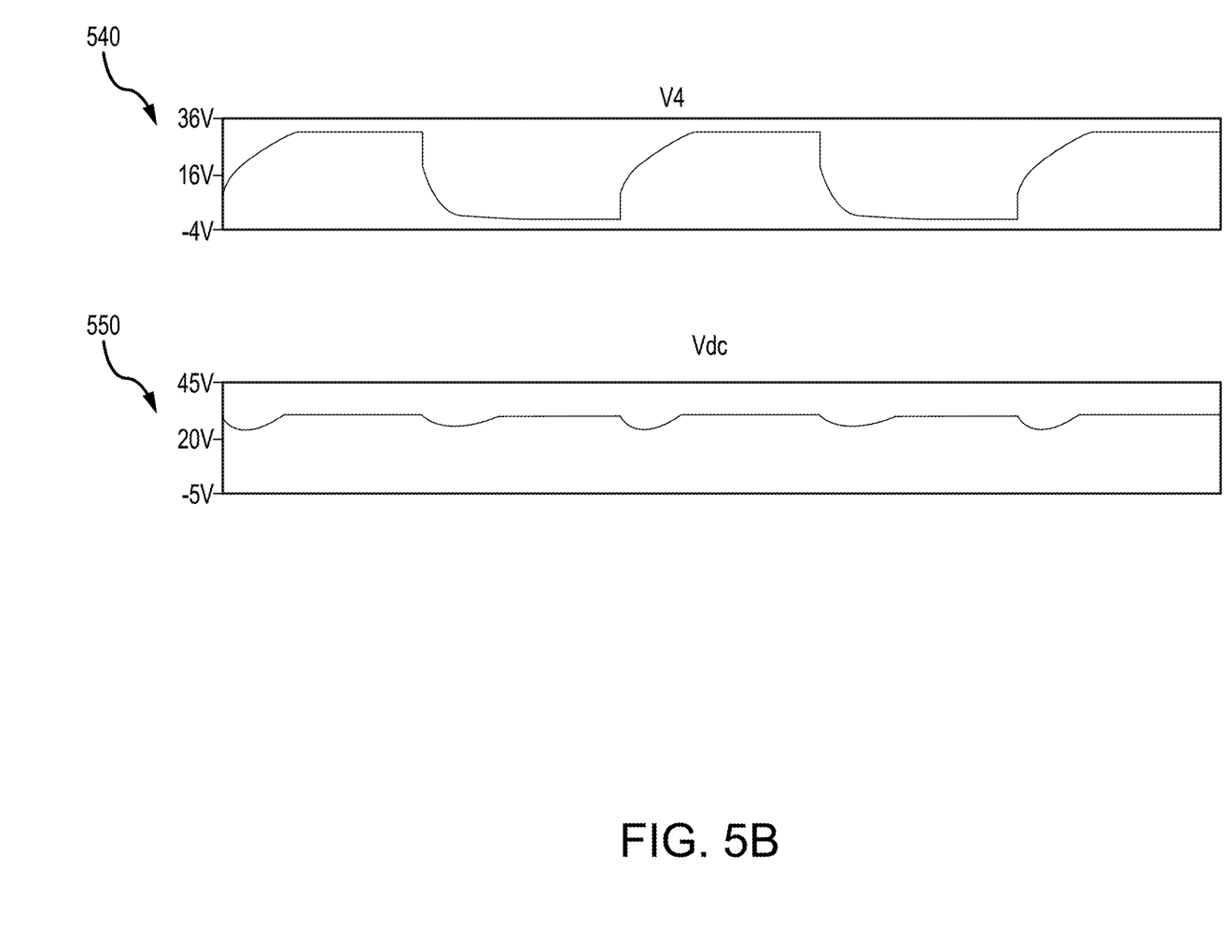
Figure 5C:
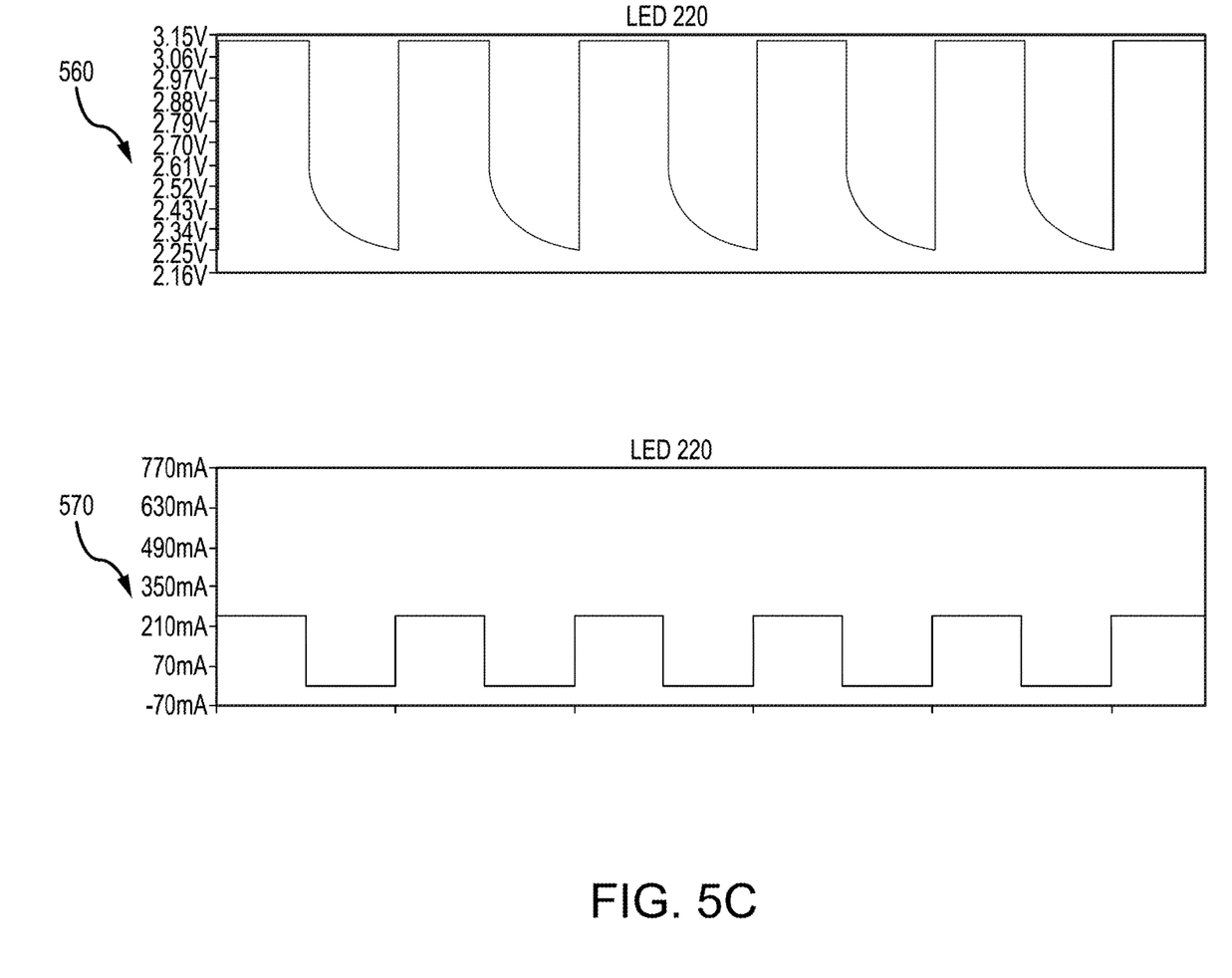

Referring now to FIGS. 5A-5C, plots 500, 510, 520, 530, 540, 550, 560, and 570 of schematic 200 under load are illustrated, in accordance with various embodiments. Plot 500 illustrates output voltage Vout over time and under the electrical load of LEDs 220. As noted, output voltage Vout is about 57.66 V which is less than output voltage Vout of 189 V with no load applied. Plot 510 illustrates voltage V(a2_out) over time and plot 520 illustrates voltage V(a3_out) over time. As illustrated, voltage V(a2_out) and voltage V(a3_out) have about the same frequency but are the inverse of each other, as described above. Plot 530 illustrates third voltage V3 over time and plot 540 illustrates fourth voltage V4 over time. Similar to voltage V(a2_out) and voltage V(a3_out), third voltage V3 and fourth voltage V4 have about the same period but are inverse of each other. Plot 550 illustrates first voltage Vdc over time which is, as described above, filter 206 and before voltage multiplier 212. Plots 560 and 570 illustrate the voltage across LEDs 220 and the current draw of LEDs 220, respectively.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 5% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 5% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A system, comprising:
   a switching direct current (DC) power source configured to provide an input voltage at a first frequency;
   a forward converter coupled to the switching DC power source, wherein the forward converter outputs a first voltage and a second voltage;
   a frequency multiplier coupled to the forward converter and configured to receive the first voltage as an input;
   a switch coupled to the frequency multiplier and configured to be driven by the frequency multiplier, wherein the switch outputs a fourth voltage; and
   a voltage multiplier coupled to the switch and configured to be driven by the switch, wherein the voltage multiplier receives the second voltage and outputs a fifth voltage that is greater than the second voltage.

2. The system of claim 1, wherein the forward converter configured to isolate the system from the switching DC power source.

3. The system of claim 1, wherein the second voltage is rectified.

4. The system of claim 1, further comprising:
   a filter coupled to the forward converter and configured to receive the second voltage and output a third voltage, wherein the third voltage is filtered or smoothed to remove pulses introduced by the switching DC power source.

5. The system of claim 4, wherein the switch further coupled to the filter.

6. The system of claim 1, wherein the frequency multiplier increases the first frequency to a second frequency.

7. The system of claim 6, wherein the second frequency is twice the first frequency.

8. The system of claim 1, further comprising:
a load coupled to the voltage multiplier and configured to be driven by the fifth voltage, wherein the load includes a plurality of light emitting diodes (LEDs); and
a current controller coupled to the load and configured to control a current flow through the load.

9. The system of claim 1, wherein the frequency multiplier comprises:
a delay circuit coupled to the forward converter;
a comparator coupled to the delay circuit;
a first XOR gate configured to receive an output from the first voltage and an output from the comparator as inputs; and
a second XOR gate configured to receive an output from the delay circuit and the output from the comparator as inputs.

10. The system of claim 1, wherein the switch is a half-bridge switch.

11. A system, comprising:
a switching direct current (DC) power source configured to provide an input voltage at a first frequency;
a forward converter coupled to the switching DC power source, wherein the forward converter outputs a first voltage and a second voltage;
a frequency divider coupled to the forward converter and configured to receive the first voltage as an input;
a switch coupled to the frequency divider and configured to be driven by the frequency divider, wherein the switch outputs a fourth voltage; and
a voltage multiplier coupled to the switch and configured to be driven by the switch, wherein the voltage multiplier receives the second voltage and outputs a fifth voltage that is greater than the second voltage.

12. The system of claim 11, further comprising:
a filter coupled to the forward converter and configured to receive the second voltage and output a third voltage, wherein the third voltage is filtered or smoothed to remove pulses introduced by the switching DC power source.

13. The system of claim 11, wherein the frequency divider decreases the first frequency to a second frequency.

14. The system of claim 11, wherein the voltage multiplier comprises:
a plurality of diodes; and
a plurality of capacitors configured to charged sequentially through a diode of the plurality of diodes in response to an output from the switch.

15. The system of claim 11, further comprising:
a filter coupled to the forward converter and configured to receive the second voltage and output a third voltage, wherein the third voltage is filtered or smoothed to remove pulses introduced by the switching DC power source.

16. The system of claim 11, further comprising:
a load coupled to the voltage multiplier and configured to be driven by the fifth voltage; and
a current controller coupled to the load and configured to control a current flow through the load.

17. The system of claim 16, wherein the load includes a plurality of light emitting diodes connected in series.

18. The system of claim 11, wherein the frequency divider comprises:
a delay circuit;
a divider configured to receive an output from the delay circuit as an input and to output a second frequency; and
an inverter configured to invert the output of the divider.

19. The system of claim 11, wherein the switch is a half-bridge switch.

20. The system of claim 11, wherein the switch comprises:
a first metal-oxide-semiconductor field effect transistor (MOSFET);
a second MOSFET coupled in series to the first MOSFET;
a first driver configured to control the first MOSFET and the second MOSFET, wherein the first MOSFET and the second MOSFET output the fourth voltage at a second frequency;
a third MOSFET;
a fourth MOSFET coupled in series to the third MOSFET; and
a second driver configured to control the third MOSFET and the fourth MOSFET, wherein the third MOSFET and the fourth MOSFET output the fourth voltage at a third frequency opposite the second frequency.

* * * * *